United States Patent [19]

Rutledge

[11] Patent Number: 4,560,334
[45] Date of Patent: Dec. 24, 1985

[54] APPARATUS FOR EXTRUDING THERMOPLASTIC COMPOSITIONS

[75] Inventor: Raleigh N. Rutledge, Big Spring, Tex.

[73] Assignee: Cosden Technology, Inc., Dallas, Tex.

[21] Appl. No.: 503,008

[22] Filed: Jun. 10, 1983

Related U.S. Application Data

[60] Continuation-in-part of Ser. No. 405,270, Aug. 4, 1982, abandoned, which is a division of Ser. No. 298,361, Sep. 1, 1981, Pat. No. 4,362,482, which is a continuation-in-part of Ser. No. 110,529, Jan. 9, 1980, abandoned.

[51] Int. Cl.⁴ .............................. B29D 7/02; B29F 3/08
[52] U.S. Cl. .................................. 425/4 C; 425/378 R; 425/817 C; 165/141; 165/155; 137/340
[58] Field of Search .............. 425/4 C, 144, 145, 146, 425/376 A, 378 R, 817 C, 377, 379, 380, 461, 465; 264/40.6; 165/141, 155; 137/340

[56] References Cited

U.S. PATENT DOCUMENTS

| | | | |
|---|---|---|---|
| 2,405,039 | 7/1946 | Jesionowski | 425/379 R |
| 3,151,192 | 9/1964 | Jacobs et al. | 204/211 |
| 3,275,731 | 9/1966 | Kosinsky | 264/176 R |
| 3,310,617 | 3/1967 | Dygert et al. | 264/53 |
| 3,385,917 | 5/1968 | Breukink et al. | 264/51 |
| 3,393,427 | 7/1968 | Larsen | 264/209.8 |
| 3,444,283 | 5/1969 | Carlson | 264/53 |
| 3,588,955 | 6/1971 | Azuma | 425/379 R |
| 3,647,344 | 3/1972 | Skibo et al. | 425/379 |
| 3,658,973 | 4/1972 | Aykanian | 264/53 |
| 3,751,377 | 8/1973 | Buckner | 521/58 |
| 3,764,642 | 10/1973 | Boutillier | 264/47 |
| 3,827,841 | 8/1974 | Kawai et al. | 425/4 C |
| 3,830,901 | 8/1974 | Winstead | 264/51 |
| 3,860,220 | 1/1975 | Matsubayashi | 366/86 |
| 4,088,434 | 5/1978 | Fukuda et al. | 425/467 |
| 4,362,482 | 12/1982 | Rutledge | 425/4 C |

FOREIGN PATENT DOCUMENTS 6405249  5/1964  Netherlands .................. 425/4 C

OTHER PUBLICATIONS

Chemical Engineers Handbook, Robert H. Perry, 1980, 5th Ed., pp. 11-8.

*Primary Examiner*—Jay H. Woo
*Assistant Examiner*—Timothy W. Heitbrink
*Attorney, Agent, or Firm*—M. Norwood Cheairs; Michael J. Caddell; Roy L. Van Winkle

[57] ABSTRACT

Disclosed is an apparatus for extruding thermoplastic compositions comprising an extruder, a die, and a cooling device positioned between the extruder and the die for cooling the heat plastified resinous composition exiting from the extruder to a uniform temperature desired for extrusion through the extrusion die. The cooling device includes at least one enclosed flow path for conveying the resinous composition from the inlet of the cooling device to the outlet of the cooling device, structure for circulating a cooling medium about the entire circumference of each of the resin flow paths, and flow control orifices at the inlet and the outlet of the cooling means across the entire cross-section of each of the resin flow paths.

15 Claims, 14 Drawing Figures

APPARATUS FOR EXTRUDING THERMOPLASTIC COMPOSITIONS

CROSS REFERENCE TO RELATED APPLICATIONS

This application is a Continuation-in-Part of Application Ser. No. 405,270 filed Aug. 4, 1982 now abandoned which is a division of Application Ser. No. 298,361 filed Sept. 1, 1981, now U.S. Pat. No. 4,362,482, which is a Continuation-in-Part of Application Ser. No. 110,529 filed Jan. 9, 1980, now abandoned.

BACKGROUND OF THE INVENTION

The present invention relates to apparatus for use in the extrusion of thermoplastic compositions and more especially to apparatus for use in the extrusion of foamed thermoplastic compositions. The apparatus disclosed herein is useful for extruding compositions comprising a major portion of at least one thermoplastic resin which is either amorphous or crystalline in nature.

In the conventional process employed in the plastics industry for extruding thermoplastic compositions, beads or pellets of at least one thermoplastic resin and various other additives are introduced into the feed zone of a screw-type extruder. In the extruder, the thermoplastic resin and additives are heated and mixed to form a substantially homogenous, continuous, flowable composition which is then forced by the screw through an extrusion die to produce a product of the desired shape and dimensions.

As the thermoplastic composition passes through the extruder, its temperature increases significantly due to the combined shear and compressive forces applied to the material by the rotating extruder screw. For a given extruder, the magnitude of the temperature increase varies according to the rotational speed of the extruder screw and the shear properties of the particular thermoplastic composition being run. While some external source heating may be necessary for achieving satisfactory extrusion, excess heat must be removed from the material downstream of the extruder in order to retain the shape and integrity of the extruded product. Typically, this is done by passing the extrudate over chill rolls or through cooling vats downstream of the extrusion die.

Because the temperature of the extrudate exiting the extrusion die is proportional to the rotational speed of the extruder screw when operating under standard conditions (i.e., an increase in throughput results in a higher temperature), conventional extrusion lines have been limited in their throughput rates by the capacity of the cooling equipment downstream of the extrusion die. Even where the downstream cooling capacity is adequate, the extrudate can undergo thermal shock if its temperature is reduced too rapidly over a wide temperature differential, thereby adversely affecting its mechanical properties.

Additional problems are encountered in the extrusion of foamed thermoplastic compositions. Extruders for foamed thermoplastic compositions are typically run at high pressures to keep the blowing agent in the polymer condensed until the composition emerges from the extrusion die. If the temperature of the foamed product as it emerges from the extrusion die is significantly greater than that required to achieve satisfactory extrusion, the blowing agent will overexpand once the pressure is relieved, resulting in cell rupture and the loss of dimensional stability and compositional integrity. If the temperature is too low, expansion will be incomplete and poor density properties will result. For some polymers, such as polyethylene, the temperature "window" is only about ±2° F.

Furthermore, the problem is not only one of achieving a specific absolute temperature, but also of achieving uniformity of temperature. If temperature gradients exist within the polymer mass, uneven blowing takes place, again causing ruptured cells and poor density values. At high throughputs, the existence of temperature gradients is more likely to occur.

Therefore, in the extrusion of foam products, it is extremely difficult to obtain an increase in throughput for an extrusion line while at the same time not causing a deterioration in the physical properties of the resulting product, such as the size, uniformity and integrity of the cells and the density value of the foamed polymer. In addition, these problems are exacerbated when desirable additives such as fire-retardants are incorporated into the foamed product.

Several measures have been taken in the past to solve these problems. For example, it is common to employ two separate extruder screws connected in series. See, e.g., U.S. Pat. No. 3,860,220. In this configuration the screw of the second extruder merely acts as a heat exchange auger to convey the thermoplastic composition through the extruder, which is jacketed and cooled with a circulating cooling medium. However, the use of a second extruder in this capacity has proven to be very expensive, both from an equipment and an energy standpoint; and it has been found to be an inefficient method for cooling a foamed material. Temperature gradients are produced by the second screw where cooling is applied from the outside. Furthermore, because of the high pressures employed in foam extrusion, problems are often encountered with the rear seals of the second extruder screw. Failure of the rear seals can result in damage to the gear box from the escaping polymer as well as undesirable leakage of the blowing agent.

Another solution is to decrease the rotational speed of the extruder screw; however, this measure is obviously antithetical to an increase in extrusion line throughput.

Another measure involves the inclusion of cooling devices in the downstream portion of the extruder (See, e.g., U.S. Pat. Nos. 3,385,917, 3,151,192, 3,444,283, 3,658,973 and British Pat. No. 2,003,080); or in conjunction with the extrusion die (See, e.g., U.S. Pat. Nos. 3,393,427, 4,088,434 and U.S.S.R. Pat. No. 592,610). These die units are initially very expensive and even more expensive to modify. Furthermore, they are not effective heat exchange elements, and therefore do not permit significant increases in throughput.

It is also possible to increase the amount of cooling capacity downstream of the extrusion die. See, e.g., U.S. Pat. No. 3,764,642. However, this gives rise to the problem of thermal shock, mentioned above, and moreover, the most essential cooling often is required upstream of the die orifice in order that the resin can be extruded within a certain required temperature range. This is essential in the case of foam extrusion.

Other attempts have been made to interpose some sort of a cooling device between the extruder and the extrusion die. See, e.g., U.S. Pat. Nos. 3,310,617, 3,275,731, 3,751,377, 3,588,955, 3,827,841 and 3,830,901. These efforts have increased the total heat exchange or cooling capacity of the extrusion line; however, they have not been successful in solving the problem of temperature uniformity, as evidenced, for example, by the need to include an additional mixing device downstream of the heat exchange or cooling device, such as, for example, in U.S. Pat. No. 3,588,955. Furthermore, while some increase in throughput has been accomplished by these measures (U.S. Pat. No. 3,827,841), it has not been possible to achieve such increases above a certain level, while at the same time producing a foamed product having the desired physical properties.

Extrusion apparatus for thermoplastic compositions is therefore needed which will permit increased throughput but which will not result in deterioration of the physical properties of the extruded product. Apparatus is particularly needed which would permit the extrusion of foamed thermoplastic compositions at increased production rates within narrow temperature limits and with excellent physical properties, preferably by means of an extruder employing a single screw.

SUMMARY OF THE INVENTION

It is therefore an object of the present invention to provide improved apparatus for extruding thermoplastic resinous materials.

It is also an object of the invention to provide apparatus which enables significantly increased throughputs of resinous material through the extrusion line, preferably with the use of a single screw-type extruder.

A further object of the invention is to provide apparatus which increases material throughput and which produces extruded products having excellent physical properties.

It is a particular object of the invention to provide improved apparatus for extruding foamed thermoplastic resinous materials which require precise temperature control and uniformity of temperature.

Another particular object of the invention is to provide apparatus which significantly increases the throughput of foamed thermoplastic material without deteriorating the physical properties of the foamed product, such as cell size, cell uniformity, density, tear resistance and the like.

It is still another object of the invention to provide apparatus for extruding foamed thermoplastic material containing significant quantities of additives, such as flame-retardants.

In accomplishing the foregoing objects, there has been provided in accordance with the present invention apparatus for extruding thermoplastic resinous compositions comprising an extruder for heat plastifying the resinous composition and forwarding same in an extrusion direction; and means positioned downstream of the extruder and communicating with the outlet port of the extruder for cooling the heat plastified resinous composition exiting from the extruder to a uniform temperature desired for extrusion through an extrusion die. The cooling means includes at least one enclosed flow path for conveying the heat plastified resinous composition from the inlet of the cooling means to the outlet of the cooling means. Also included is means for circulating a cooling medium about the entire circumference of each of the resin flow paths and means for controlling the flow path at the inlet and the outlet of the cooling means across the entire cross-section of each of the resin flow paths. An extrusion die is positioned downstream of the cooling means to communicate with the outlet of the cooling means for receiving cooled, heat plastified resinous composition therefrom for extrusion through the die orifice. Preferably, the extruder comprises only a single extruder screw and means for introducing a blowing agent into the heat plastified thermoplastic resinous composition contained in the extruder.

In one embodiment of the invention, the cooling means comprises a substantially cylindrical vessel having three generally concentrically arranged axial passageways, wherein the enclosed flow path comprises the middle passageway, and the cooling medium circulating means comprises the inner and outer passageways. In this embodiment, a plurality of flow control orifices are evenly spaced and circumferentially located about the inlet end of the middle passageway. In addition, a plurality of flow control orifices are evenly spaced and circumferentially located about the outlet end of the middle passageway.

Further objects, features and advantages of the present invention will become readily apparent from the detailed description which follows, when considered together with the drawings.

BRIEF DESCRIPTION OF THE DRAWINGS

The invention will be explained in further detail with reference to the accompanying drawings wherein.

DETAILED DESCRIPTION OF THE PREFERRED EMBODIMENTS

Figure 1:
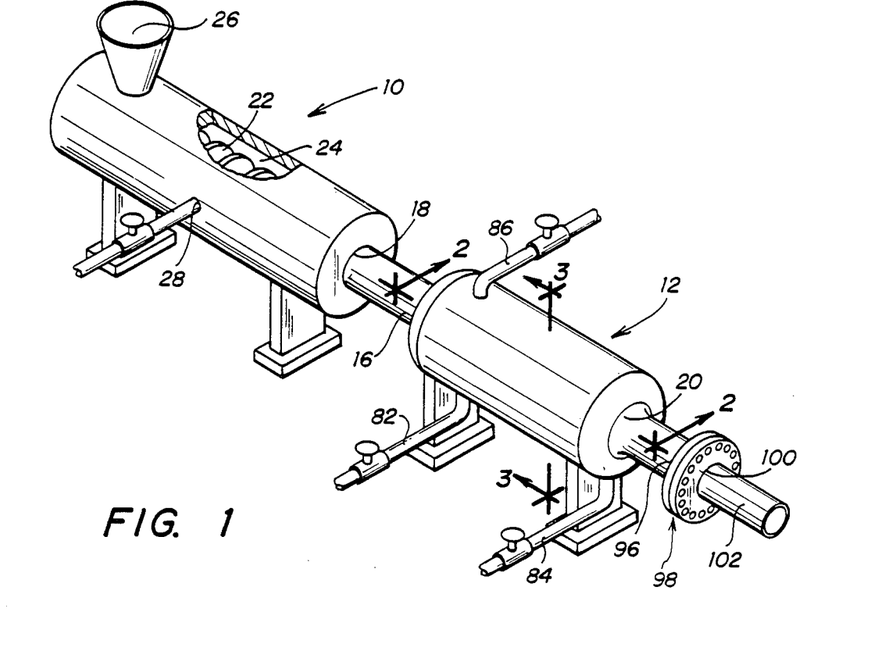
FIG. 1 is a simplified perspective view of the apparatus disclosed herein for extruding foamed thermoplastic compositions.

Referring to FIG. 1, there is illustrated a combination comprising extruder 10, cooling means 12 and extrusion die 98 positioned so that inlet port 16 of cooling means 12 communicates with outlet port 18 of extruder 10, and extrusion die 98 communicates with outlet port 20 of cooling means 12. A tubular extruded product 102 is shown exiting from die orifice 100. Extruder 10 has been partially cut away to reveal barrel 24 having a single extruder screw 22 positioned therein in such a manner that the screw 22 is rotatable about its longitudinal axis. Thermoplastic material is introduced into extruder 10 through feed port 26. When producing foamed thermoplastic compositions, a blowing agent is introduced through blowing agent inlet port 28 into barrel 24 around extruder screw 22. Extruder 10 is a conventional motor-driven, single stage, screw-type extruder which is commercially available and well known to those of ordinary skill in the art.

Figure 2:
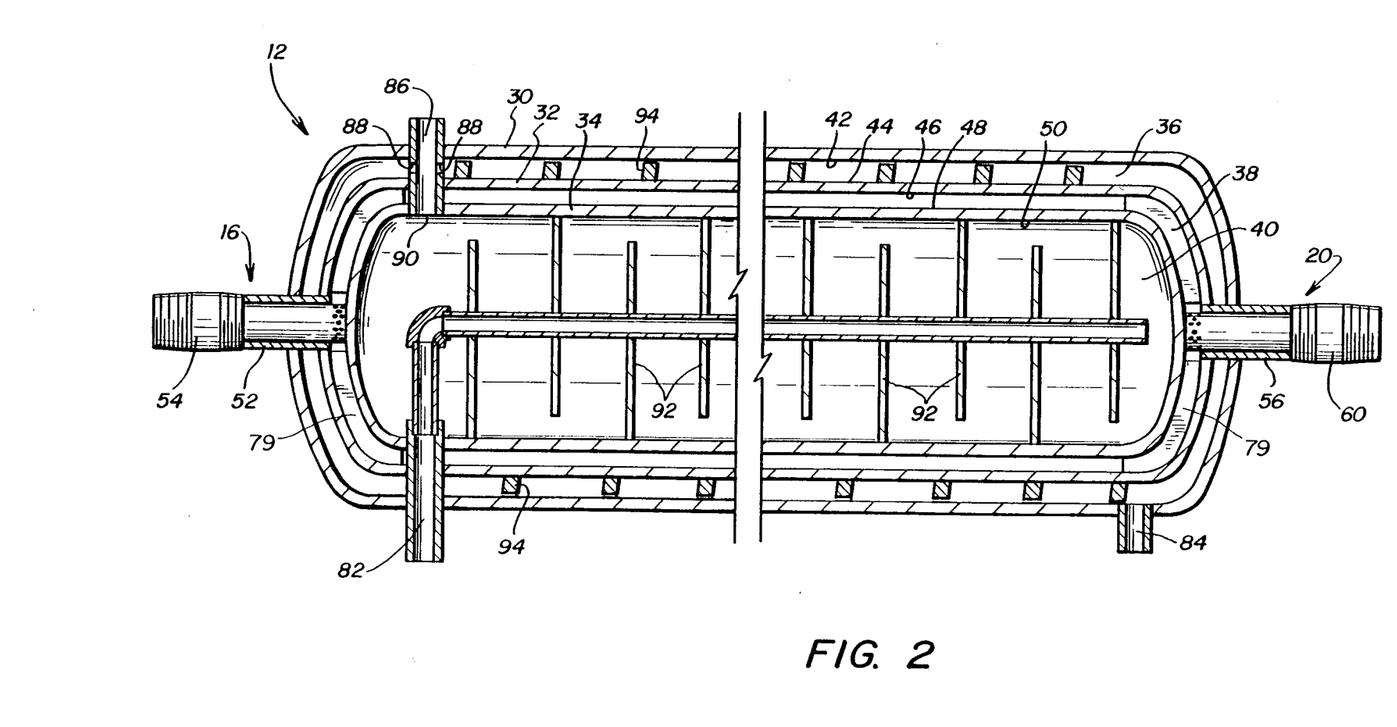
FIG. 2 is a longitudinal sectional view of the cooling means of the invention viewed along line 2—2 of FIG. 1.
Figures 3, 4:
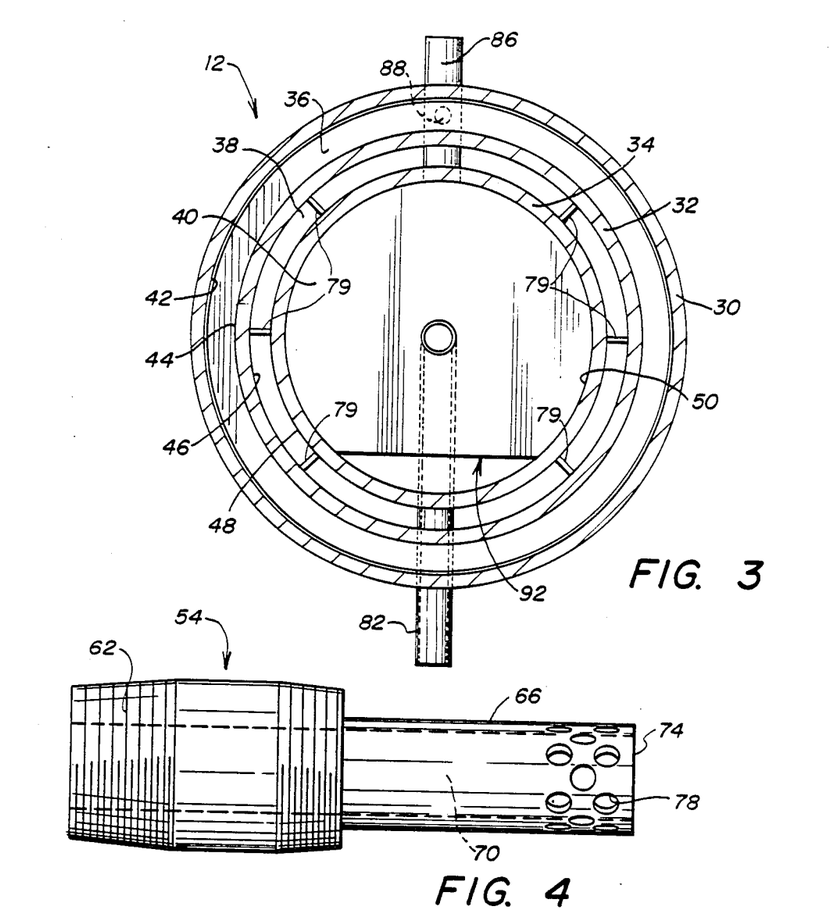
FIG. 3 is a transverse sectional view of the cooling means shown in FIG. 2, viewed along line 3—3 of FIG. 1.
FIG. 4 is an elevational view of an inlet nozzle for the cooling means in FIGS. 1-3.

FIG. 2 is a longitudinal sectional view of one embodiment of cooling means 12. Cooling means 12 comprises a three-chambered, substantially cylindrical vessel adapted to transfer heat from a thermoplastic composition which is received through cooling means inlet port 16 from outlet port 18 of extruder 10 shown in FIG. 1. More particularly, cooling means 12 comprises three concentrically and coaxially positioned vessels identified in FIG. 2 as outer vessel 30, middle vessel 32 and inner vessel 34. The three vessels are substantially cylindrical in shape, having annular cross-sections as shown in FIG. 3. The lengths and diameters of the vessels are preferably designed so that inner wall 42 of outer vessel 30 and outer wall 44 of middle vessel 32 are equidistant at all points to define outer chamber 36. Although not shown in FIG. 2, it will be apparent to those of ordinary skill that positioning pins can be employed where needed to aid in maintaining the concentric alignment of the vessels. The exact spacing in any particular design will depend on the design flow rate and the properties of the fluid therein. Similarly, inner wall 46 of middle vessel 32 and outer wall 48 of inner vessel 34 are substantially equidistant at all points, thereby defining middle chamber 38 for the flow of a heat plastified resinous material. Finally, inner chamber 40 is defined by inner wall 50 of inner vessel 34.

Cooling means 12 is adapted to receive a thermoplastic composition from extruder 10 by attaching cooling means inlet port 16 to the proximal end of middle vessel 32 in such a manner that the interior of cooling means inlet port 16 communicates with middle chamber 38. Preferably, as shown in FIG. 2, exterior wall 52 of cooling means inlet port 16 is threaded to receive inlet nozzle 54. Likewise, exterior wall 56 of cooling means outlet port 20 is preferably threaded to receive outlet nozzle 60.

Figure 5:
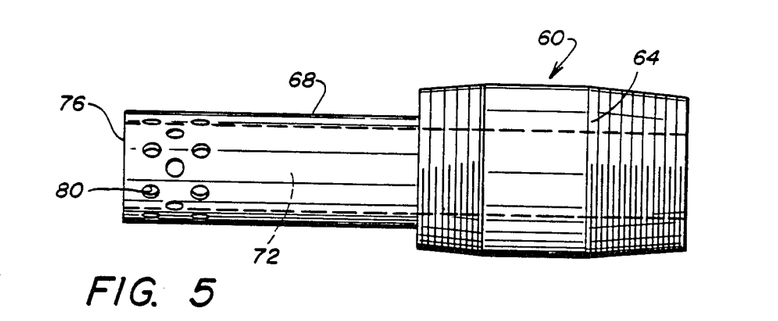
FIG. 5 is an elevational view of an outlet nozzle for the cooling means in FIGS. 1-3.

Inlet nozzle 54 and outlet nozzle 60 are further described with reference to FIGS. 4 and 5. Inlet nozzle 54 and outlet nozzle 60 each comprise threaded engagement members 62, 64 and elongated sleeve members 66, 68, respectively. Elongated sleeve members 66, 68 further include longitudinal bores 70, 72 having diameters which are adequate to accommodate the flow of thermoplastic composition passing therethrough. The length of sleeve members 66, 68 is preferably such that, when engagement member 62 of inlet nozzle 54 and engagement member 64 of outlet nozzle 60 are connected to inlet port 16 and outlet port 20, respectively, sleeve end faces 74, 76 will contact the end walls 75, 77 respectively of inner vessel 34, as shown in FIG. 2. To permit the thermoplastic composition to flow from inlet nozzle 54 into middle chamber 38 and from middle chamber 38 into outlet nozzle 60, each nozzle further comprises a plurality of orifices 78, 80 radially bored through a portion of sleeve members 66, 68 positioned inside middle chamber 38 when engagement members 62, 64 of nozzles 54, 60 are threadably engaged with their respective ports and the sleeve end faces 74, 76 abut the end wall of inner vessel 34.

In accordance with the present invention, it has also been discovered that the throughput of an extrusion line such as the one illustrated in FIG. 1 can be considerably increased in comparison to other extrusion lines if measures are taken to maintain sufficient mixing of the thermoplastic resin as it flows through cooling means 12. This is achieved as shown in FIGS. 2–5 by the proper placement and sizing of flow control orifices 78, 80 in the inlet and outlet nozzles 54, 60. The total cross-sectional area of the orifices 80 is larger than the total cross sectional area of the orifices 78.

Flow control orifices 78, 80 are distributed uniformly around the circumference of sleeve members 66, 68 so that the thermoplastic resin is metered uniformly into middle chamber 38 about its entire circumference, and so that the thermoplastic resin will uniformly converge into outlet nozzle 60. Although not wishing to be bound by theory, it is believed that orifices 78, 80 cause turbulent flow of the thermoplastic material passing therethrough. The turbulent flow causes mixing of the thermoplastic material as it enters and as it exits the cooling means 12, thereby providing increased transfer of heat from the thermoplastic material to cooling means 12. Orifices 78, 80 are intended to alleviate the problems which occur when the temperature of the extrudate in an arcuate portion of the flow annulus is lower than that of the remaining extrudate resulting in an increase in viscosity and a corresponding decrease in flow velocity for that arcuate portion. The increased viscosity is a self-feeding phenomenon since, as the material in one flow annulus or arcuate stream cools, the viscosity of the material therein increases resulting in a lower flow velocity, which in turn causes further cooling and further increases in viscosity. This phenomenon is generally known as channelling. The differences in viscosity in various arcuate portions of the flow annulus due to the temperature variations in the material creates imperfections in the final product. It has been found that when orifices 78, 80 are removed from cooling means 12, widely varying temperature occur in the material exiting cooling means 12, indicating that channelling or some other similar undesirable effect is occurring. The orifices 78, 80 alleviate these temperature variations in the material.

This function of providing uniform flow of thermoplastic resin can be augmented by providing a plurality of baffle or vane members 79 which are disposed about the circumference of the generally circular outer surface 48 at the end walls 75, 77. Baffles 79 emanate radially from the immediate vicinity of inlet and outlet nozzles 54, 60 and can be positioned between each set of circumferentially adjacent orifices 78, 80 or between groups of circumferentially adjacent orifices 78, 80. Baffles 79 preferably extend across the entire gap width of middle chamber 38 defined by outer surface 48 and inner surface 46. Baffle members 79 extend from nozzles 16, 20 around the curvature of end walls 75, 77 and into the straight flow portion of middle chamber 38.

The combined area of orifices 80 in outlet nozzle 60 may be somewhat larger than that of orifices 78 of inlet nozzle 54. This slight increase in area of orifices 80 in outlet nozzle 60 is sufficient to create a uniform flow upstream of orifices 80, thereby promoting uniform mass flow of the thermoplastic composition. Larger outlet flow areas are also needed because of the increase in viscosity of the melt resulting from its cooling as it moves through the cooling means.

As shown in FIGS. 1-3, cooling means 12 further comprises means for receiving and circulating a cooling medium on both sides of middle chamber 38 through which the thermoplastic composition flows. More particularly, first cooling medium inlet pipe 82 (FIG. 2) is connected to inner vessel 34 in such a manner that it communicates with inner chamber 40 of cooling means 12. Similarly, second cooling medium inlet pipe 84 is connected to outer vessel 30 so that it communicates with outer chamber 36. Cooling medium inlet pipes 82, 84 are preferably connected to vessels 30, 34, respectively, in such a manner that the cooling medium flowing into cooling means 12 initially contacts outer wall 44 of middle vessel 32 and inner wall 50 of inner vessel 34 near the downstream end of middle chamber 38. When constructed in this manner, the flow of cooling medium through outer chamber 36 and inner chamber 40 is substantially contradirectional to the flow of thermoplastic composition through middle chamber 38, thereby promoting more efficient heat transfer. Cooling means 12 further comprises cooling medium outlet pipe 86 which communicates by means of cooling medium outlets 88, 90 with outer chamber 36 and inner chamber 40, respectively.

A satisfactory cooling medium for use with cooling means 12 is a conventional low viscosity hydraulic oil which is capable of being pumped and which has good temperature stability and good heat transfer capability. After exiting cooling means 12, the cooling medium can itself be cooled such as, for example, with water and then recirculated to first and second cooling medium inlet pipes 82, 84.

To promote heat transfer between the thermoplastic composition and the circulating cooling medium, it is desirable to control the flow of circulating cooling medium through outlet chamber 36 and inner chamber 40 in such a manner that it maintains significant surface contact with outer wall 44 of middle vessel 32 and inner wall 50 of inner vessel 34. Satisfactory results have been achieved by means of the flow control devices 78, 80 depicted in FIGS. 2 and 3. In addition, vertical baffles 92 have been positioned inside inner chamber 40 and affixed to inner wall 50 of inner vessel 34. Also, metal band 94 has been spirally wrapped around outer wall 44 of middle vessel 32 and welded thereto to direct the flow of cooling medium entering outer chamber 36 from cooling medium inlet pipe 82 into a much longer flowpath to cooling medium outlet ports 88, 90.

Referring again to FIG. 1, cooling means outlet port 20 is connected to and communicates with extrusion die inlet port 96. Upon exiting cooling means 12, the cooled thermoplastic composition is directed through the annular die orifice 100 via extrusion die inlet port 96. When extruding resin compositions containing a blowing agent, the extruder profile undergoes rapid expansion upon exiting the die orifice 100. Expansion of extrudate 102 occurs since the external pressure is reduced to atmospheric level upon exiting extrusion die 98, permitting the blowing agent to expand around each nucleator particle, thereby forming the individual cells. While extrudate 102 is shown in FIG. 1 as a foamed thermoplastic tube, it will be readily understood that the shape and dimensions of extrudate 102 can be varied to any desired configuration by the substitution of a different extrusion die.

Although the foregoing detailed description has been directed to one embodiment useful for the production of foamed thermoplastic articles, it will be apparent that the disclosed apparatus is also useful for the production of thermoplastic compositions containing no blowing agent. Thus, for example, by closing blowing agent inlet port 28 by means of a valve or the like, and by substituting a sheet die in place of die 98, it is possible to extrude a thermoplastic sheet material by the same apparatus.

Satisfactory thermoplastic resins for use in the subject apparatus are selected from the group consisting of both crystalline and amorphous polymers. Preferred thermoplastic resins for use in the subject apparatus include, for example, polystyrene, polyvinyl chloride, acrylonitrile-butadiene-styrene, polyethylene, polypropylene, polyalkylene terephthalates, and the like. Those of ordinary skill will appreciate that various other copolymers and terpolymers of the above-mentioned crystalline and amorphous polymers can also be employed in the subject apparatus. In addition to the thermoplastic resin, the composition provided to the feed port of the extruder can also comprise other optional constituents, including lubricants, nucleators, rubbery materials, ionomer resins, coloring agents, ultra-violet light stabilizers, fire-retardants, and the like. Where the apparatus is employed for the production of foamed thermoplastic compositions, satisfactory blowing agents include, for example, methyl chloride, carbon dioxide, ammonia, air, n-pentane, isopentane, fluorocarbons, and mixtures thereof.

Figure 6:
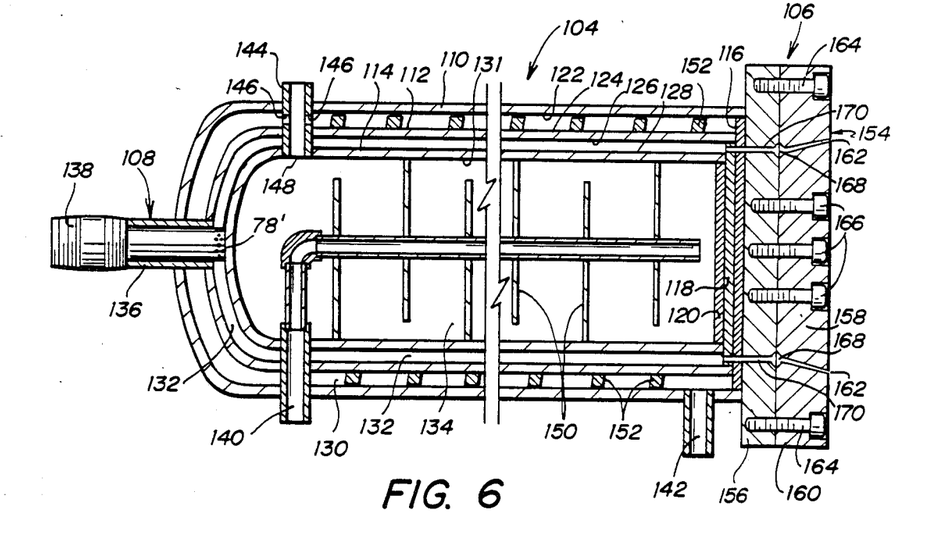
FIG. 6 is a longitudinal sectional view of another embodiment of the cooling means, comprising an extrusion die communicating with and integrally attached to the distal end of the cooling means.

According to another embodiment of the invention illustrated in FIG. 6, the subject apparatus comprises cooling assembly 104 and extrusion die assembly 106. Cooling assembly 104 preferably comprises a three-chambered, substantially cylindrical vessel adapted to transfer heat from a thermoplastic composition received through inlet port 108 from the outlet port 18 of an extruder 10. More particularly, cooling assembly 104 preferably comprises three concentrically and coaxially positioned vessels identified in FIG. 6 as outer vessel 110, middle vessel 112 and inner vessel 114. The three vessels are substantially cylindrical in shape and have annular cross-sections. The upstream ends of outer vessel 110, middle vessel 112 and inner vessel 114 are enclosed by conventional weld caps; the downstream ends of those vessels are enclosed by flat, circular plates 116, 118, 120 which are welded to vessels 110, 112, 114, respectively. The length and diameters of the vessels are preferably designed in such manner that inner wall 122 of outer vessel 110 and outer wall 124 of middle vessel 122 are equidistant at all points to define an outer chamber 130. The exact spacing in any particular design will depend on the design flow rate and the properties of the fluids involved. Similarly, inner wall 126 of middle vessel 112 and outer wall 128 of inner vessel 114 are preferably equidistant at all points, thereby defining middle chamber 132 for the flow of a thermoplastic resin. Finally, inner chamber 134 is defined by inner wall 131 of inner vessel 114.

Cooling assembly 104 is adapted to receive a thermoplastic composition by attaching inlet port 108 to the upstream end of middle vessel 112 in such a manner that the inlet port 108 communicates with middle chamber 132. Preferably, exterior wall 136 of inlet port 108 is threaded to receive inlet nozzle 138. Inlet nozzle 138 is similar to inlet nozzle 54 shown in FIG. 4, which may be referred to further details of inlet nozzle 138.

Cooling assembly 104 is adapted to receive and circulate a cooling medium on both sides of middle chamber 132 through which the thermoplastic composition flows. First cooling medium inlet pipe 140 is connected to inner vessel 114 in such manner that it communicates with inner chamber 134 of cooling assembly 104. Similarly, second cooling medium inlet pipe 142 is connected to outer vessel 110 in such manner that it communicates with outer chamber 130. Cooling medium inlet pipes 140, 142 are preferably connected to vessels 114, 110, respectively, in such manner that the cooling medium flowing into cooling assembly 104 initially contacts outer wall 124 of middle vessel 112 and inner wall 131 of inner vessel 114 near the downstream end of middle chamber 132. When constructed in this manner, the flow of cooling medium through outer chamber 130 and inner chamber 134 is substantially contradirectional to the flow of thermoplastic composition through middle chamber 132, thereby promoting more efficient heat transfer. Cooling assembly 104 further comprises cooling medium outlet pipe 144 which communicates by means of cooling medium outlet ports 146, 148 with outer chamber 130 and inner chamber 134, respectively.

To promote heat transfer between the thermoplastic composition and the circulating cooling medium, it is desirable to control the flow of circulating cooling medium through outer chamber 130 and inner chamber 134 in such a manner that it maintains significant surface contact with outer wall 124 of middle vessel 112 and inner wall 131 of inner vessel 114. Satisfactory results have been achieved by means of vertical baffles 150 positioned inside inner chamber 134 and affixed to inner wall 131 of inner vessel 114. Similarly, a metal band 152 is spirally wrapped around outer wall 124 of middle vessel 112 and affixed thereto to direct the flow of cooling medium entering outer chamber 130 from cooling medium inlet pipe 142 through an extended flowpath to the outlet ports 146 in cooling medium outlet pipe 144.

As shown in FIG. 6, extrusion die assembly 106 comprises extrusion die 154 and flange plate 156. Flange plate 156 is welded both to end plate 116 and outer vessel 110 of cooling assembly 104. Extrusion die 154 is a conventional annular die comprising inner annular die member 158 and outer annular die member 160, which together define annular orifice 162. Inner die member 158 and outer die member 160 are mounted on flange plate 156 by means of threaded engagement bolts 164, 166, respectively. Annulus 162 communicates with annular reservoir 168, which in turn communicates with middle chamber 132 of cooling means assembly 104 through a plurality of outlet orifices 170 bored through flange plate 156 and end walls 116, 118 at evenly spaced intervals around the annulus defined by the transverse cross-section of middle chamber 132.

A plurality of orifices 78' are provided in inlet nozzle 138 similar to inlet orifices 78 illustrated in FIG. 4. At the outlet end of cooling means 104, a plurality of outlet orifices 170 are provided in end walls 116 and 118, in order to provide communication between middle chamber 132 and annular extrusion orifice 162 of extrusion die 154. The outlet orifices 170 operate in a manner similar to that of the outlet orifices 80 in FIGS. 2 and 3. Orifices 170 are somewhat larger than the inlet orifices 78' in order to maintain a substantially uniform mass flow around the circumference of middle chamber 132.

According to another embodiment of the invention, the apparatus described in FIG. 6 is employed in combination with any conventional extruder to provide novel apparatus for extruding thermoplastic compositions at significantly increased throughput rates.

Figure 7:
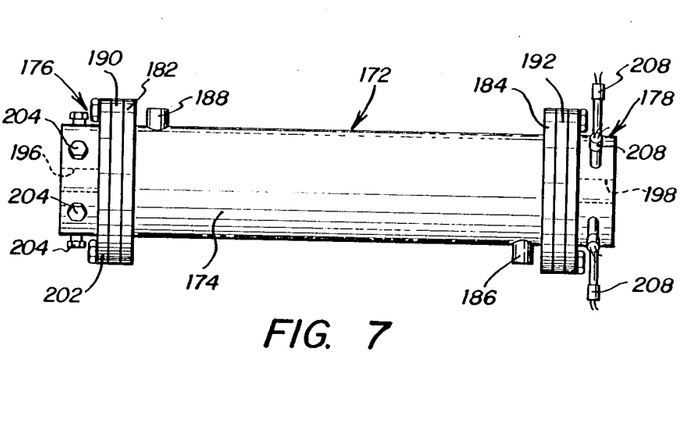
FIG. 7 is a longitudinal elevational view of another embodiment of the cooling means.
Figure 8:
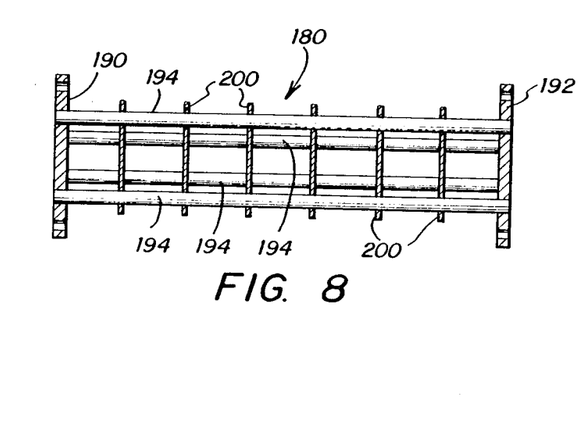
FIG. 8 is a longitudinal sectional view of the tube sheet portion of the cooling means in FIG. 7.

Another embodiment of the present invention is described in FIGS. 7-14. FIG. 7 depicts a cooling means 172, which is adapted to circulate a cooling medium around a plurality of tubes 194 positioned inside shell 174. In addition to shell 174, cooling means 172 comprises inlet valve assembly 176, outlet thermocouple assembly 178, and tube sheet portion 180 normally positioned inside shell 174, but for illustrative purposes shown in FIG. 8, isolated from the shell 174.

Shell 174 is preferably a substantially cylindrical vessel adapted for use in cooling means 172 by the addition of inlet shell flange 182, outlet shell flange 184, cooling medium inlet port 186, and cooling medium outlet port 188. Tube sheet portion 180 is adapted to be positioned inside shell 174 and bolted thereto by means of inlet tube sheet flange 190 and outlet tube sheet flange 192, or other functionally equivalent means. Tube sheet portion 180 comprises a plurality of tubes 194 adapted for transporting a thermoplastic polymer composition from polymer inlet port 196 to polymer outlet port 198 generally contradirectional to the flow of cooling medium through shell 174. The flow of cooling medium through shell 174 can be further controlled by the addition of baffles 200 or the like to tube sheet portion 180, as shown in FIG. 8. According to one embodiment depicted in FIGS. 7-13, tube sheet portion 180 comprises six metal tubes which are evenly spaced and circumferentially located about the longitudinal axis of cooling means 172.

It has been found that the throughput of a cooling device of the tube-in-shell type illustrated in FIGS. 7 and 8 can be significantly increased by localized turbulent flow of the thermoplastic across the entire cross-section of the cooling device. As a result, a significant increase in throughput is also possible for any extrusion line in which the cooling device is employed.

Turbulent flow is maintained across the cooling device by carefully controlling the pressure drop through the individual tubes 194. This is preferably accomplished by creating an orifice in the upstream end of each tube 194. These orifices can be either of fixed size or of variable size. In carrying out this embodiment, it is preferred to use tubes having an internal diameter of between about ½ inch and about 2 inches. If the tube diameter becomes considerably smaller than ½ inch, the orifice must be made extremely small. This in turn causes a considerable pressure build-up, which actually contributes to an increase in temperature as the polymer passes through the cooling device due to the resulting work energy. If the tubes have a diameter of more than about 2 inches, the heat transfer coefficient between polymer located near the center of the tube and the cooling medium becomes too low to accomplish efficient cooling. Tubes having an internal diameter of about one inch have been found to offer a good compromise between pressure drop and heat transfer coefficient.

Figure 9:
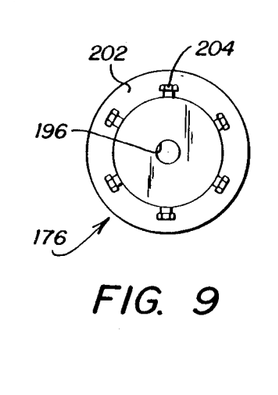
FIG. 9 is a transverse elevational view of the inlet end of the cooling means in FIG. 7.

One means of providing an orifice at the inlet end of each tube 194 is to position a valve in each tube as illustrated in FIGS. 7 and 9. Inlet valve assembly 176 comprises polymer inlet port 196, inlet flange plate 202, and a plurality of valves 204, one for each of the tubes 194. By including a separate valve for each tube, it is possible to control the flow of thermoplastic composition through tubes 194 to maintain proper mixing across the cooling device and to maximize heat transfer to the cooling medium circulating through shell 174.

Figure 12:
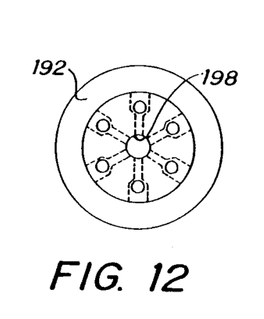
FIG. 12 is a transverse elevational view of the outlet end of the tube sheet portion of a cooling means of the type shown in FIG. 7.
Figure 13:
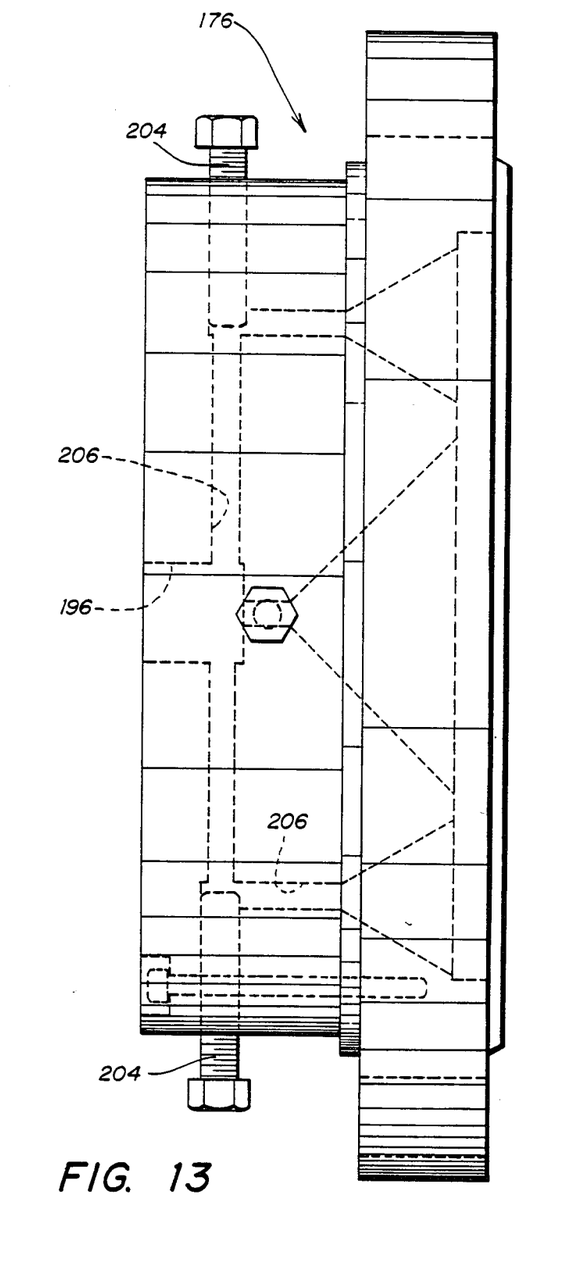
FIG. 13 is a sectional elevational view of the inlet valve assembly of the cooling means in FIG. 7.

FIG. 12 illustrates a polymer collection outlet by which the flow of polymer through tubes 194 is collected via passageways 210 and fed into polymer outlet port 198.

Figure 11:
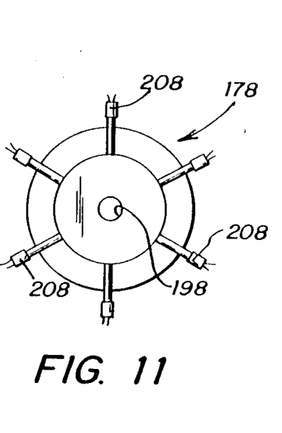
FIG. 11 is a transverse elevational view of the outlet end of the cooling means shown in FIG. 7.

According to one preferred embodiment of cooling means 172, the temperature of the thermoplastic composition exiting each tube 194 is monitored by thermocouples 208 positioned in outlet thermocouple assembly 178 as shown in FIGS. 7 and 11. For example, the thermocouples 208 may be positioned in the passageways 210 of the polymer collection outlet shown in FIG. 12. When the temperature of the thermoplastic composition exiting any tube 194 becomes too great, this indicates that the polymer melt is beginning to selectively channel through the tube. It is then possible to place this tube back into temperature balance by partially closing the corresponding valve 204 in inlet valve assembly 176. It will be apparent that this control process can be done either manually or automatically through the use of conventional instrumentation operatively linking the valves 204 with their respective thermocouples 208.

Figure 10:
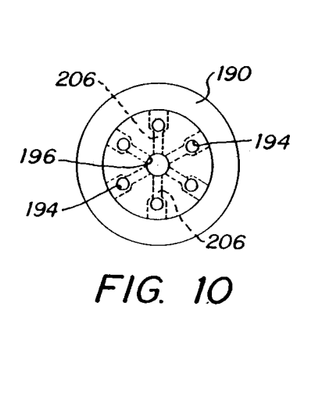
FIG. 10 is a transverse elevational view of the inlet end of the tube sheet portion of a cooling means of the type shown in FIG. 7.
Figure 14:
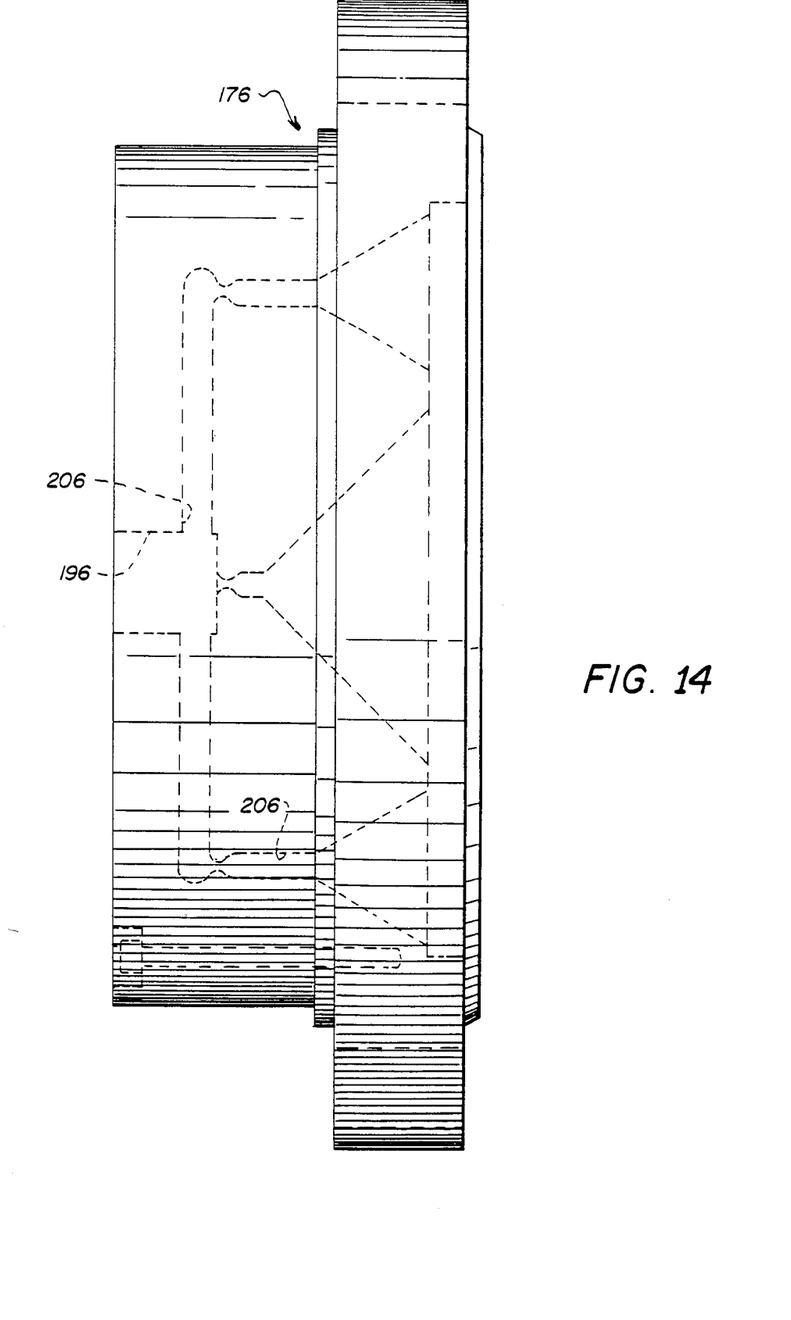
FIG. 14 is an isolated transverse elevational view of an intermediate plate which can be used in one embodiment of a cooling means of the type shown in FIG. 7.

In an alternate embodiment, an orifice can be provided at the inlet end of each tube 194 by insertion of an intermediate plate 230 between the tube sheet flange 190 and inlet flange plate 202 of polymer distribution inlet 220 shown in FIG. 10, and further illustrated separately in FIG. 14. Plate 230 is provided with a plurality of apertures 232 corresponding to the number of tubes 194 and positioned in plate 230 in the same spatial configuration as the tubes 194 are fixed within tube sheet 190. The size of apertures 232 must be predetermined to satisfy the mixing requirements for the particular tube size and polymer material which is to be processed. It is a simple matter to adapt the extrusion apparatus for processing different polymeric materials since a number of interchangeable intermediate plates 230 having different aperture sizes can be provided, and the appropriate one can be readily inserted into the cooling means 172 as required.

In another embodiment of the present invention, the cooling means 12 is constructed so that it contains, at any one time, a volume of polymeric material which is larger than the volume of heat plastified polymer contained in the extruder 10. Preferably, the volume of polymer in the cooling means is at least 2 times and more preferably at least 5 or 6 times the volume contained in the extruder. By running the extruder at a higher speed the polymer exiting from the extruder will be at a higher temperature. In the case of a foamed polymer extrusion process, however, this higher temperature is advantageous while the polymer is still in the extruder, because it is easier to disperse the blowing agent uniformly therein, e.g., Freon-type blowing agents are more soluble at higher temperatures.

Therefore, in accordance with the present invention, it is possible to run the extruder at a very high speed. This not only increases the throughput of the extruder line, but has the added benefit of producing an improved foamed product, i.e., a product with a more uniform cell size distribution because of improved dispersion of the blowing agent throughout the polymer.

By virtue of the increased efficiency as a result of the mixing, pressure, and velocity control of the extrudate achieved by the cooling means, the polymer can be brought to a uniform temperature, i.e., there are no appreciable temperature gradients within the polymer mass. This is advantageous in a process for producing foamed thermoplastic products since the resulting uniformity of expansion produces an improved product having a uniform density and cell structure.

With these foregoing features, the apparatus of the present invention is especially well suited for extruding foamed products from thermoplastic polymers which require exact temperature control and uniformity just prior to being passed through the extrusion die orifice. Temperature uniformity is assured by the above-described measure of pressure control, flow velocity control and localized mixing across the cooling device, and this in turn permits precise temperature control by the use of a cooling medium having a temperature which is kept at the final temperature desired for the polymer. As a result of the precise temperature control, the apparatus is particularly suited for extrusion of foamed polymers having very critical temperature control constraints, such as polyethylene. In fact, it is even possible to produce at greatly increased rates foamed polyethylene products of excellent quality which contain high percentages of additives, such as fire-retardants.

By employing this apparatus, it is possible to achieve throughput rates up to about five times greater than those previously experienced in conventional extrusion apparatus. Furthermore, the subject apparatus permits the production of foamed thermoplastic compositions having significantly lower densities, smaller average cell size and more uniformity of cell size than those made by conventional methods.

While this invention has been described in relation to various embodiments, it is to be understood that various modifications thereof will be apparent to those or ordinary skill in the art, and it is intended to cover all such modifications.

The embodiments of the present invention in which an exclusive privilege or property is claimed are defined as follows:

1. Apparatus for extruding thermoplastic resinous compositions, comprising:
   an extruder for heat plastifying the resinous composition and forwarding said resinous composition in an extrusion direction;
   cooling means, positioned downstream of said extruder having an inlet communicating with an outlet port of said extruder, for cooling the heat plastified resinous composition exiting from said extruder to a uniform temperature desired for extrusion through an extrusion die, said cooling means including at least one enclosed resin flow path for conveying the heat plastified resinous composition from the inlet of said cooling means to an outlet of said cooling means;
   means for circulating a cooling medium about the entire circumference of each of said resin flow paths, said means for circulating the cooling medium comprising means for circulating the cooling medium generally counter-directional to the flow of said heat plastified thermoplastic resinous composition through said cooling means;
   flow control orifices at the inlet and outlet of said cooling means across substantially the entire cross section of each of said resin flow paths; and,
   an extrusion die including a die orifice, positioned downstream of said cooling means communicating with the outlet of said cooling means for receiving homogenous cooled, heat plastified resinous composition therefrom for extrusion through said die orifice.

2. Apparatus for extruding thermoplastic resins compositions, comprising:
an extruder for heat plastifying the resinous composition and forwarding said resinous composition in an extrusion direction;
cooling means, positioned downstream of said extruder having an inlet communicating with an outlet port of said extruder for cooling the heat plastified resinous composition exiting from said extruder to a uniform temperature desired for extrusion through an extrusion die, said cooling means including at least one enclosed resin flow path for conveying the heat plastified resinous composition from said inlet of said cooling means to an outlet of said cooling means, said cooling means also including a substantially cylindrical vessel having three generally concentrically arranged axial passageways, wherein said enclosed flow path comprises the middle passageway,
means for circulating a cooling medium through inner and outer passageways of said concentrically arranged passageways;
flow orifices at the inlet and outlet of said cooling means across substantially the entire cross section of each said resin flow path; and,
an extrusion die, including a die orifice, positioned downstream of said cooling means and communicating with the outlet of said cooling means for receiving homogenous cooled, heat plastified resinous compositions therefrom for extrusion through the die orifice.

3. The apparatus of claim 2, wherein said flow control orifices comprise a plurality of first apertures evenly spaced about the circumference of the inlet end of said middle passageway and a plurality of second apertures evenly spaced about the circumference of the outlet end of said middle passageway.

4. The apparatus of claim 3, wherein the total cross-sectional area of said second apertures is larger than the total cross-sectional area of said first apertures.

5. The apparatus of claim 2, wherein said cooling means comprises three concentrically and coaxially positioned, substantially cylindrical vessels having generally parallel cylindrical surfaces and generally parallel semi-circular ends, wherein the inlet end of said middle chamber comprises an inlet conduit passing through the upstream ends of the outer vessel and the middle vessel, and abutting against the upstream end of the inner vessel, and wherein the outlet end of said middle chamber comprises an outlet conduit passing through the downstream ends of the outer vessel and the middle vessel, and abutting against the downstream end of the inner vessel.

6. The apparatus of claim 5, wherein said first apertures are formed in said inlet conduit between the upstream ends of the inner and middle vessels, and said second apertures are formed in said outlet conduit between the downstream ends of the inner and middle vessels.

7. The apparatus of claim 6, wherein said cooling means further comprises means, including a plurality of circumferentially spaced vane members radially extending between a space defined by the upstream ends of the inner and middle vessels for uniformly distributing the heat plastified resinous composition about the entire cross-section of said enclosed flow path.

8. The apparatus of claim 7, wherein said cooling means further comprises means, including a plurality of circumferentially spaced vane members radially extending between a space defined by the downstream ends of the inner and middle vessels for uniformly collecting the heat plastified resinous composition from the entire cross-section of said enclosed flow path.

9. The apparatus of claim 6, wherein said cooling medium circulating means includes a first cooling medium inlet conduit for introducing cooling medium into the downstream end of the inner vessel, a second cooling medium inlet conduit for introducing cooling medium into the downstream end of the outer vessel in said outer chamber, and a cooling medium outlet positioned at the upstream end of said cooling means and communicating with said inner and outer chambers.

10. The apparatus of claim 9, wherein said cooling medium circulating means further includes baffle members positioned in said inner and outer chambers perpendicular to the flow of the cooling medium.

11. Apparatus for extruding thermoplastic resins compositions, comprising:
an extruder for heat plastifying the resinous composition and forwarding said resinous composition in an extrusion direction;
cooling means, positioned downstream of said extruder and communicating with an outlet port of said extruder, for cooling the heat plastified resinous composition exiting from said extruder to a uniform temperature desired for said extruder, said cooling means including an inlet connected to the extruder outlet, cylindrical means forming three generally concentrically arranged axial passageways having a first end connected to said inlet and having a second end, an extrusion die closing the second end of said cooling means and having a plurality of apertures in said die connected with the middle passageway formed in said cylindrical means.

12. An extrusion system for extruding foamed polymeric material, said system comprising:
(a) a heat exchanger for strictly controlling the temperature, pressure, and flow rate of an extruded thermoplastic melt flowing therethrough, said heat exchanger comprising:
(i) an elongated outer shell having a relatively constant cross-sectional area down the length thereof;
(ii) an elongated intermediate shell made of a heat conducting metal and located substantially concentrically within said outer shell;
(iii) an inner shell made of a heat conducting metal and located substantially concentrically within said intermediate shell;
(iv) coolant flow means for supplying a liquid coolant to the areas inside said inner shell and between said intermediate and outer shells;
(v) inlet conduit means communicating with the annular area between said intermediate shell and said inner shell at one end thereof by means of inlet orifices passing through the wall of a tubular conduit; and
(vi) outlet conduit means at the opposite end of said inner shell, extending through said other two shells, and having outlet orifices therethrough communicating with said annular area, said outlet orifices having a larger total cross-sectional area than said inlet orifices.

(b) An extruder for imparting work energy to a thermoplastic polymer and having means therein for applying additional constituents, including foaming agents, into said polymer; said extruder being connected at its exit port to said heat exchanger inlet conduit; and (c) an extrusion die connected to said outlet conduit means.

13. The extrusion system of claim 12 wherein the flow of liquid coolant is contradirectional to the flow of thermoplastic melt through the heat exchanger.

14. The extrusion system of claim 13 additionally comprising a plurality of vane members radially extending between a flow space defined by the upstream ends of the inner shell and intermediate shell, the vane members positioned parallel to the longitudinal axis of said heat exchanger to uniformly distribute the heat plastified resinous compound about the entire cross section of the flow space.

15. The extrusion system of claim 14 additionally comprising a member spirally wound about the circumference of said intermediate shell to direct the flow of the liquid coolant circumferentially about the intermediate shell and along the length thereof.

* * * * *